United States Patent [19]

Leiman

[11] Patent Number: 4,549,622
[45] Date of Patent: Oct. 29, 1985

[54] HEAVY DUTY WEIGH SCALE
[75] Inventor: Leslie L. Leiman, Dugald, Canada
[73] Assignee: Superior Scale Co. Ltd., Winnepeg, Canada
[21] Appl. No.: 505,877
[22] Filed: Jun. 20, 1983
[51] Int. Cl.[4] .................. G01G 19/02; G01G 3/14; G01G 21/12
[52] U.S. Cl. .................. 177/134; 177/211; 177/255
[58] Field of Search .................. 177/211, 255, 134
[56] References Cited
U.S. PATENT DOCUMENTS 3,879,998  4/1975  Bradley .................. 177/211 X
4,066,140  1/1978  Conley .................. 177/255 X Primary Examiner—George H. Miller, Jr.
Attorney, Agent, or Firm—Stanley G. Ade

[57] ABSTRACT

The weigh scale incorporates a weighbridge, load cells and load cell mounting mechanisms for each load cell. The load cells are double ended shear beam type horizontally mounted directly under the main beams of the weighbridge with the ends of the load cells being rigidly secured to a load cell stand which in turn is supported upon the concrete base of the weigh scale location. The load is vertically applied to the load cell by means of a chair for each load cell and a link plate. Each of the sides or legs of the chair rest upon the supporting means of the link plate which in turn applies a vertical shearing force upon the load cell intermediate the ends thereof. The support points or areas of the link plate are located below the engagement point or area of the link plate upon the load cell and this permits free horizontal movement of the weighbridge longitudinally, but absorbs any side movement thereof without affecting the conventional electronic indicator to which the load cells are operatively connected.

15 Claims, 9 Drawing Figures

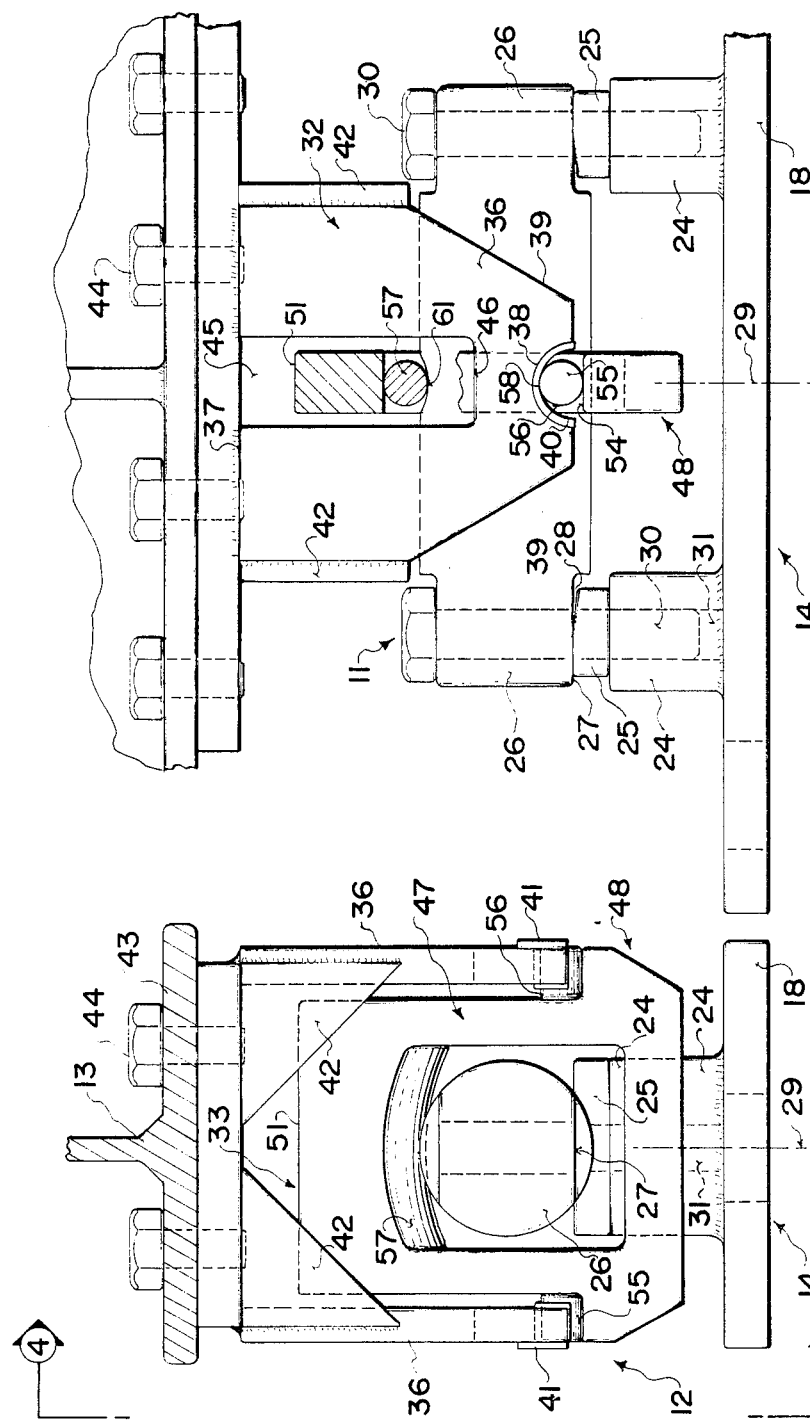

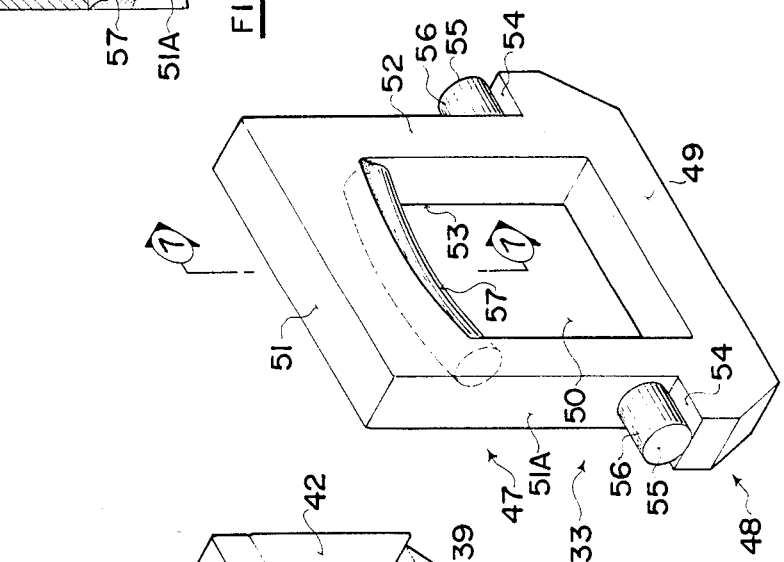
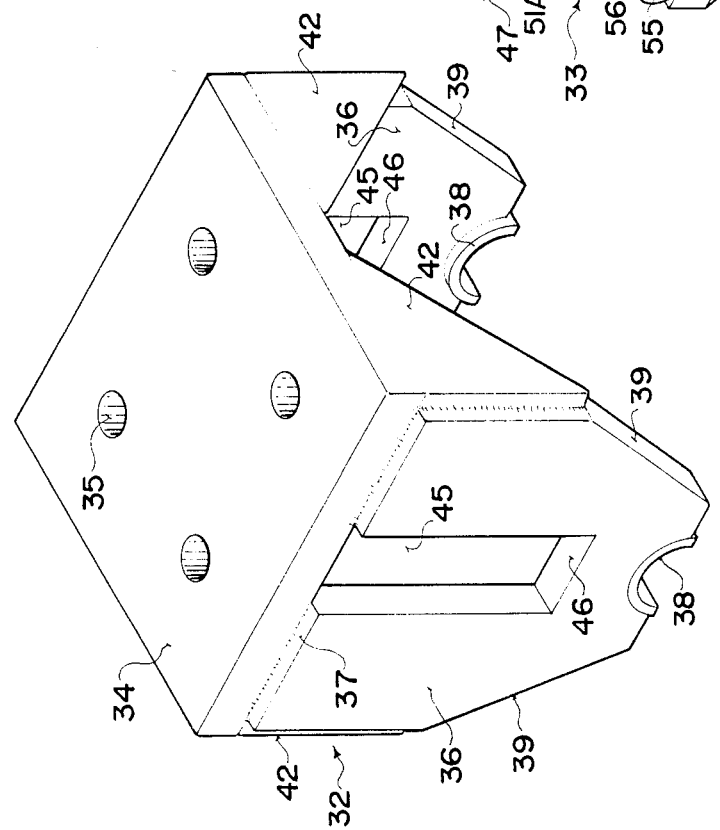

HEAVY DUTY WEIGH SCALE

BACKGROUND OF THE INVENTION

This invention relates to new and useful improvements in weigh scales, particularly heavy duty weigh scales used for trucks, equipment and the like.

It is conventional to support a weighbridge component upon a plurality of load cells with the load cells being operatively connected to electronic indicator means so that the overall weight of the load upon the weighbridge is indicated upon the scale or indicating means.

It will be appreciated that there are various influences upon the weighbridge component when a vehicle or piece of equipment is thereon, said influences resulting in horizontal forces from many directions. For example, fore and aft or longitudinal movement is initiated by the movement of the vehicle onto the weighbridge component and of course wind forces may influence the weighbridge component from any direction.

Unless the mountings allow for these influences, they will affect the indicating means so that a false or fluctuating weight may be indicated.

In order to avoid this, it is conventional to mount the weighbridge upon the transducers or load cells in a manner either to restrict horizontal movement in all directions by installing rigid checking or to allow pendulous horizontal movement in all directions.

An example of the latter is U.S. Pat. No. 4,066,146-Conley-which is specifically directed to a structure permitting horizontal movement in all directions due to the double link construction thereof.

SUMMARY OF THE INVENTION

The present invention overcomes disadvantages inherent with conventional weigh scales by providing an assembly freely supported upon a plurality of transducers or load cells which in turn are supported by the ends thereof upon a support surface so that the weighbridge can move with limits, in a direction along the longitudinal axis or fore and aft, but is restrained from movement in other directions without rigid checking and without affecting the transducers or load cells thereby preventing any distortion of the weight readings upon the weigh scale or indicator means under normal conditions.

In accordance with the invention there is provided a heavy duty weigh scale for trucks, equipment and the like, mountable upon a concrete supporting base or the like and comprising in combination a substantially rectangular weighbridge component, and means operatively mounting said weighbridge component upon said base, said means including a plurality of load cell assemblies operatively supporting said weighbridge component upon said base, each load cell assembly including a load cell support means secured to said base, a double ended shear beam load cell secured by the ends thereof to said support means, a chair secured to the underside of said weighbridge and a suspension link plate operatively connecting said chair to said load cell intermediate the ends of said load cell whereby the vertical shearing force from said weighbridge is applied to said load cell in a zone intermediate the ends thereof, said load cell lying parallel to the longitudinal axis of the weighbridge component, said chair being operatively connected by the legs thereof to the said link plate on an axis perpendicular to the axis of the load cell.

In accordance with another aspect of the invention, there is provided a chair and link plate assembly for operatively supporting a weighbridge upon a load cell intermediate the ends of said load cell whereby the vertical shearing force from said weighbridge is applied to said load cell in a zone intermediate the supported ends of said load cell; said chair and link plate assembly comprising in combination a chair for supporting the weighbridge and a suspension link plate operatively connecting said chair to said load cell, the operative connection of said chair to said link plate being below the operative connection of said link plate to said load cell thereby permitting free longitudinal movement of said weighbridge, within limits, and restraining sideways movement of said weighbridge.

Another advantage of the invention is that all of the mounting points of the weighbridge component are tangential thereby giving, in effect, point contact thus improving the operation of the weigh scale by decreasing oscillations inherent to other pendulously mounted systems and yet at the same time absorbing any horizontal movement beyond the longitudinal movement of the weighbridge component.

Another advantage of the invention is that it is extremely simple to install and can be used either in a pit-type environment or a pitless environment.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicnt and of the preferred typical embodiment of the principles of the present invention, in which:

DESCRIPTION OF THE DRAWINGS

FIG. 3 is an enlarged end elevation of one of the load cell mounts and supports therefor.

FIG. 4 is a view similar to FIG. 3, but taken substantially on the line 4—4 thereof with parts in section for clarity.

FIG. 5 is an isometric view of the chair per se.

FIG. 6 is an isometric view of the link plate per se.

FIG. 7 is a cross sectional view of the upper wall of the link plate showing the convex curvature of the bearings means at this point.

In the drawings like characters of reference indicate corresponding parts in the different figures.

BRIEF DESCRIPTION

Figure 1:
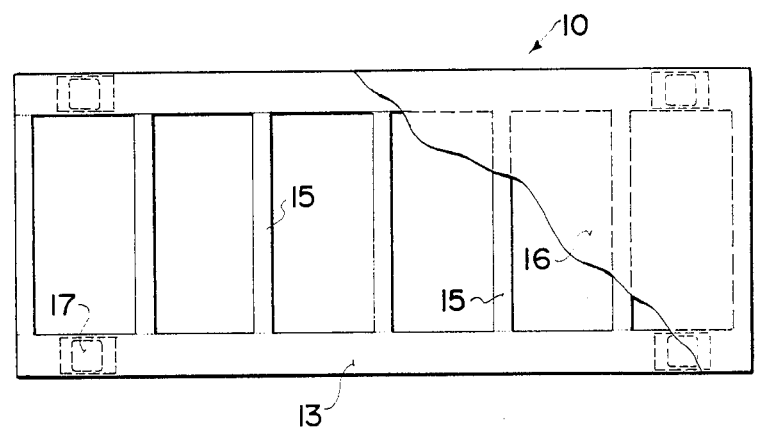
FIG. 1 is a schematic partially broken-away top plan view of a conventional weigh scale showing suggested locations of the load cell supports.

The weighing device is a full electronic truck or equipment scale designed primarily for heavy duty use but of course usable under other circumstances, if desired.

It can be of a standard size and capacity and may be used with any compatible conventional electronic indicator. Furthermore, it is usable in both pit and pitless locations.

It includes three main components, a weighbridge component collectively designated 10, the load cells collectively designated 11 and the load cell mounting assemblies collectively designated 12. The load cells are conventional transducers of the double ended shear beam type and they are horizontally mounted directly under the main beams 13 of the weighbridge component with both ends being rigidly affixed to the load cell stand collectively designated 14.

All of the load cells are connected via cables, junction boxes and instruments, all of which are conventional, to a source of power and to a conventional weight indicator or indicating means (not illustrated).

When used on the pitless type installations, the cables should be run in conduits for protection and should be shielded and the power and signal cables should be run in separate conduits to prevent electrical interference with the cables from the load cells to the indicating means.

DETAILED DESCRIPTION

Figure 2:
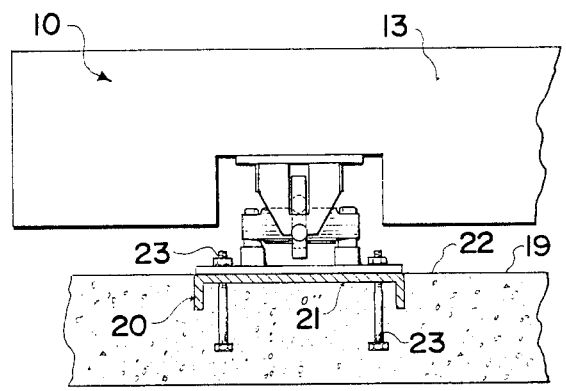
FIG. 2 is a fragmentary schematic side elevation of FIG. 1, broken away in part to show the location of the load cell and support therefor.

In detail, reference should first be made to FIGS. 1 and 2. Reference character 10 shows schematically, a conventional weigh beam component comprising a pair of spaced and parallel longitudinally extending main beams or girders 13 with cross members 15 extending therebetween to form the substantially rectangular platform covered by the upper surface 16, all of which is conventional.

It is usual to provide support for the weighbridge component adjacent each corner thereof as indicated in phantom in FIG. 1, by reference character 17, it being understood that this incorporates the components 11, 12 and 14 hereinbefore mentioned.

In the present embodiment, there are four such supporting structures 17, each one of which in detail includes a load cell support stand base 18. These are mounted upon the conventional concrete base 19 and in the preferred embodiment, it is desired that channel members 20 be set into the concrete as it is poured with the upper horizontal flange 21 being substantially flush with the upper surface 22 of the concrete, and being levelled when being installed. In the present description and drawings, any superstructure which may be mounted between these flanged plates or channels 20 and the base plates 18 of the support stands, has been eliminated for clarity.

The support stands 18 are bolted to the plate 21 by means of bolts 23 thus providing a platform upon which the transducer or load cell support blocks 24 may be mounted. Spacer blocks 25 in turn engage upon the upper surfaces of the support blocks 24 and the ends 26 of the transducer or load cell 11, in turn are supported upon the spacers 25.

Figures 8, 9:
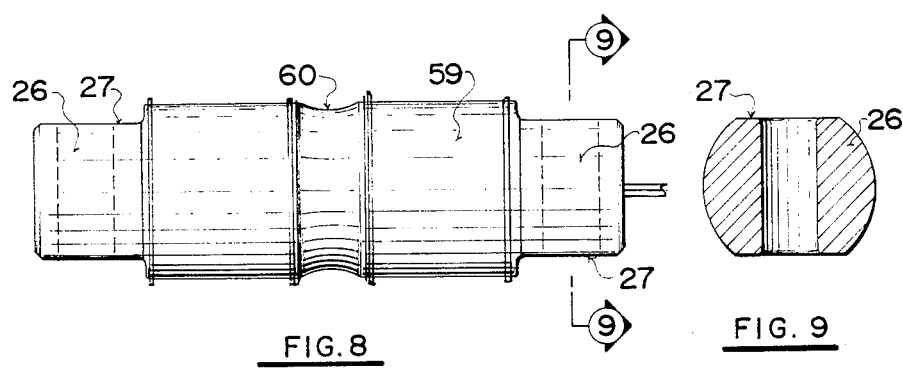
FIG. 8 is a front elevation of a conventional load cell of transducer usable with the present invention.
FIG. 9 is a section along the lines 9—9 of FIG. 8.

Reference to FIGS. 8 and 9 will show that the load cells are provided with upper and lower horizontal or flattened surfaces 27 which are spaced and parallel to one another as clearly shown in FIG. 9. Reference to FIG. 4 will show that the spacer blocks 25 are provided with a slightly convex upper surface 28 which cuves downwardly and inwardly towards the vertical center line or axis 29 of the assembly when installed. In one or more of the claims, these upper surfaces are stated to curve downwardly and inwardly from the vertical center line of blocks 25 towards one another.

Bolts 30 extend through apertures within the ends 26 of the load cells through apertures within the spacer blocks and screw threadably engage screw threaded apertures 31 within the support blocks 24. These support blocks may either be welded to the base plate 18, or alternatively the base plates may be apertured (not illustrated) and screw threaded to receive the ends of the bolts 30 thus clamping securely, the load cell in a horizontal location, upon the base 18.

The convex curvature of the upper surfaces 28 of the spacer blocks provides a tangential mount between the flat or horizontal ends 26 of the load cell adjacent the outer sides of the spacer blocks thus extending the effective width of the load cell and permitting the slight flexing of the load cell when a load is applied.

The chair and link assembly 12 includes a chair collectively designated 32 and a suspension link component collectively designated 33 shown in detail in FIGS. 5 and 6 respectively.

The chair consists of a pair of spaced and parallel horizontally situated upper sides 34 which are apertured as at 35. Alternatively, it will be appreciated that this upper side could be one solid plate with the apertures 35 formed therein. A pair of spaced and parallel side plates or walls 36 depend downwardly from each end 37 of the upper sides 34 and terminate in semi-circular or arcuately curved bearings 38, one upon each side wall thereof and centrally between the edges 39 of these side plates or walls. A hardened half bushing 40 may be engaged within these concave recesses and conventional friction steels 41 may also be provided. These are shown in FIG. 3, but are removed from FIG. 4 for clarity.

Substantially triangular reinforcing plates 42 brace the side walls 36 to the upper wall portion 35 as shown in FIGS. 3 and 4.

The chairs are bolted or otherwise secured to the underside or lower flange 43 of the main I-beams 13 of the weighbridge component 10, reference character 44 indicating such bolts which may screw threadably engage within the screw threaded apertures 35 thus securing the chairs firmly to the underside of the weighbridge in the desired locations. It will be noted that vertically situated slots 45 extend downwardly from between the upper wall portions 34 and terminate at locations 46 within the side walls or plates 36 as clearly shown in FIG. 5. This permits access and viewing of the mounting of the link plate 33 to the load cell 11 as will hereinafter be described.

The link plate 33, shown in FIGS. 6 and 7, includes an upper portion collectively designated 47 and a support or base portion collectively designated 48 extending one upon each side of the lower wall or side 49 of the upper portion 47. The upper portion, in the preferred embodiment, is substantially rectangular and is centrally apertured as at 50. The upper portion includes the upper horizontal wall 51, a pair of spaced and parallel downwardly depending vertical side walls 51A and the aforementioned base wall 49, all of which define the aforementioned central aperture 50 which extends clear through the upper portion 47 from one face 52 to the other face 53.

The extending support portions 48 include the horizontal shoulders 54 upon which are supported cylindrical bearing portions 55 with at least the upper walls 56 thereof being convexedly curved as clearly shown. Further bearing means 57 are provided within the upper side of the aperture 50 and on the underside of the upper wall 51 and this, in the preferred embodiment, is formed from a hardened steel and is convexedly curved both when viewed in front elevation and when viewed in cross sectional elevation as shown in FIG. 7.

The aforementioned concave bearings 38 of the chair operatively engage over the convex upper surfaces 56 of the bearings 55 and it will be observed that the curvature of the concave bearings 38 is greater than the curvature of the convex surfaces 56 so that the chair bearings 38 engage upon the link bearings 55 tangentially as indicated by reference character 58 in FIG. 4.

The link in turn is operatively mounted upon the transducer or load cell 11 as will hereinafter be explained.

FIG. 8 shows a typical load cell or transducer including the aforementioned flattened ends 26 with strain gauge portions 59 being situated inboard thereof. A medial groove 60 is formed around at least the upper side of the load cell between the portions 59 and in practice, this preferably takes the form of an annular groove extending clear around the perimeter of the center of the load cell. It will be observed that when viewed in front elevation as shown in FIG. 8, at least the upper portion of this groove is concavedly curved.

It will also be observed from FIG. 4 that the curvature of this groove 60 is larger than the curvature of the further bearing portion 57, both from side to side and from face to face.

The link plate 33 engages over the annular groove or partial annular groove 60 and is therefore suspended intermediate the ends of the load cell and contacts the groove 60 tangentially as indicated by reference character 61 in FIG. 4.

It will also be observed that the longitudinal axis of the bearing means 57 is parallel to the longitudinal axis of the bearings 55 with both being normal to the longitudinal axis of the main beams 13 of the weighbridge component. This means that the weighbridge component can pivot freely within limits along the longitudinal axis thereof or in a fore and aft direction limited by conventional bumper bolts (not illustrated) but that the mounting of the chair 32 upon the link 33 restrains or prevents any horizontal movement of the weighbridge in any other direction but that due to the type of mounting of the link to the load cell, only very minimal torsional forces are transferred to the load cell which might cause erroneous results to be indicated on the indicator means.

It will therefore be seen that the load is vertically applied to the load cell or transducer 11 by means of the chair 32 and the link plate 33. Each of the two legs 36 of the chair rest tangentially upon the bearings or supporting points 56 of the link plate which in turn applies the vertical shearing force in a zone intermediate the ends of the transducer or load cell 11 thus permitting free horizontal movement of the weighbridge along the longitudinal axis, within limits, being restricted along that axis by the aforementioned conventional bumper bolts (not illustrated).

Lateral or other horizontal movements are checked by the link plate 33 and these horizontal lateral forces are transferred by the chair 32, to the link plate which in turn is checked by the load cell 11 without interfering with the operational characteristics of the load cell.

As mentioned previously, all of the load cells are mounted upon the pre-levelled template or channel members 20 which are installed at the same time that the foundation pad 19 is poured.

Finally, although the axes of the bearings 55 and 57 are parallel, nevertheless it will be observed that the chair is situated at right angles to the link plate and this, together with the tangential mountings hereinbefore described, provides a simple mounting with the minimum of moving parts and requiring the minimum of maintenance.

Summarizing, advantages includes the facts that the height of the system is lower than conventional systems by approximately six inches and the cost of manufacturing is substantially lower as the mounting apparatus is installed directly under the weighbridge.

Because the support systems are mounted directly under the longitudinal beams of the weighbridge, the overall width is less because conventional systems locate the load cells beside the weighbridge.

The mountings permit free horizontal movement of the weighbridge along the longitudinal axis thereof limited by bumper stops but prevents lateral or other horizontal movements from occurring.

Finally, the present invention can be used without change in either a pitless or pit-type installation whereas conventional systems usually require considerable modification from one to the other.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A heavy duty weigh scale for trucks, equipment and the like, mountable upon a concrete supporting base or the like and comprising in combination a substantially rectangular weighbridge component, and means operatively mounting said weighbridge component upon said base, said means including a plurality of load cell assemblies operatively supporting said weighbridge component upon said base, each load cell assembly including a load cell support means secured to said base, a double ended shear beam load cell secured by the ends thereof to said support means, a chair secured to the underside of said weighbridge and a suspension link plate operatively connecting said chair to said load cell intermediate the ends of said load cell whereby the vertical shearing force from said weighbridge is applied to said load cell in a zone intermediate the ends thereof, said load cell lying parallel to the longitudinal axis of the weighbridge component, said chair being operatively connected by to the said link plate on a longitudinal axis perpendicular to the longitudinal axis of the load cell thereby permitting free longitudinal movement of said weighbridge component, within limits, said link plate including a substantially rectangular, open centered upper portion and a support portion extending one upon each side of the base of said upper portion, bearing means on each of said support portions operatively supporting said chair, the longitudinal axis of said bearing means lying perpendicular to the longitudinal axis of said load cell, said supper portion having a pair of opposed faces and a pair of side walls, an upper wall, and a base wall, said walls defining the aperture through said upper portion from one face to the other face and further bearing means on said upper wall defining said aperture, operatively connecting said link plate to said load cell, said load cell including a medial groove formed thereon at least over the top portion thereof and being normal to the longitudinal axis of the load cell, said groove having a concave curvature when viewed in front elevation, said further bearing means being convexedly curved at least on the underside thereof, when viewed in cross section and also when viewed in front elevation, the curvature of said medial groove being greater than the curvature of said further bearing means whereby said bearing means engages said medial groove substantially tangentially, said medial groove and said bearing means on each of said support portions lying in a common vertical plane thereby forming a triangle of contact points preventing any substantial sideways movement of said weighbridge component.

2. The invention according to claim 1 in which said load cell includes a planar, horizontal undersurface at each end thereof engaging said load cell support means, said load cell support means including a support block, a spacer on each of said support blocks, the upper surfaces of said spacers curving inwardly and downwardly towards one another thereby providing a convex upper surface, said planar horizontal undersurfaces of said load cell engaging said upper surfaces of said spacers adjacent the outer ends of said upper surfaces, tangentially.

3. The invention according to claim 1 in which said bearing means on said link plate are convexedly curved on at least the upper surface thereof, said curvature of said concave bearings on said chair being greater than the convex curvature of said bearing means on said link plate whereby said concave bearings engage said bearing means tangentially.

4. The invention according to claim 3 in which said load cell includes a planar, horizontal undersurface at each end thereof engaging said load cell support means, said load cell support means including a support block, a spacer on each of said support blocks, the upper surfaces of said spacers curving inwardly and downwardly towards one another thereby providing a convex upper surface, said planar horizontal undersurfaces of said load cell engaging said upper surfaces of said spacers adjacent the outer ends of said upper surfaces, tangentially.

5. The invention according to claim 1 in which said chair includes a substantially horizontal planar attaching plate for securement to said weighbridge, a pair of spaced and parallel opposed side plates extending downwardly from opposing edges of said attaching plate, one upon each side thereof, and a concave substantially semi-circular bearing on the lower end of each side plate centrally located between the ends of said side plates and operatively engaging said link plate.

6. The invention according to claim 5 in which said load cell includes a planar, horizontal undersurface at each end thereof engaging said load cell support means, said load cell support means including a support block, a spacer on each of said support blocks, the upper surfaces of said spacers curving inwardly and downwardly towards one another thereby providing a convex upper surface, said planar horizontal undersurfaces of said load cell engaging said upper surfaces of said spacers adjacent the outer ends of said upper surfaces, tangentially.

7. The invention according to claim 5 in which said bearing means on said link plate are convexedly curved on at least the upper surface thereof, said curvature of said concave bearings on said chair being greater than the convex curvature of said bearing means on said link plate whereby said concave bearings engage said bearing means tangentially.

8. The invention according to claim 1 in which the operative connection of said chair to said link plate is below the operative connection of said link plate to said load cell.

9. The invention according to claim 8 in which said load cell includes a planar, horizontal undersurface at each end thereof engaging said load cell support means, said load cell support means including a support block, a spacer on each of said support blocks, the upper surfaces of said spacers curving inwardly and downwardly towards one another thereby providing a convex upper surface, said planar horizontal undersurfaces of said load cell engaging said upper surfaces of said spacers adjacent the outer ends of said upper surfaces, tangentially.

10. The invention according to claim 2 in which said bearing means on said link plate are convexedly curved on at least the upper surface thereof, said curvature of said concave bearings on said chair being greater than the convex curvature of said bearing means on said link plate whereby said concave bearings engage said bearing means tangentially.

11. The invention according to claim 10 in which said load cell includes a planar, horizontal undersurface at each end thereof engaging said load cell support means, said load cell support means including a support block, a spacer on each of said support blocks, the upper surfaces of said spacers curving inwardly and downwardly towards one another thereby providing a convex upper surface, said planar horizontal undersurfaces of said load cell engaging said upper surfaces of said spacers adjacent the outer ends of said upper surfaces, tangentially.

12. A chair and link plate assembly for operatively supporting a weighbridge upon a load cell intermediate the ends of said load cell whereby the vertical shearing force from said weighbridge is applied to said load cell in a zone intermediate the supported ends of said load cell; said chair and link plate assembly comprising in combination a chair for supporting the weighbridge and a suspension link plate operatively connecting said chair to said load cell, the operative connection of said chair to said link plate being below the operative connection of said link plate to said load cell thereby permitting free longitudinal movement of said weighbridge, within limits, said link plate including a substantially rectangular open centered upper portion and a support portion extending one upon each side of the base of said upper portion, bearing means on each of said support portions operatively supporting said chair, said upper portion having a pair of opposed faces and including a pair of side walls, an upper wall, and a base wall, said walls defining the aperture through said upper portion from one face to the other face and further bearing means on said upper wall defining said aperture, operatively connecting said link plate to said load cell, said load cell including a medial groove formed thereon at least over the top portion thereof and being normal to the longitudinal axis of the load cell, said groove having a concave curvature when viewed in front elevation, said further bearing means being convexedly curved at least on the underside thereof, when viewed in cross section and also when viewed in front elevation, the curvature of said medial groove being greater than the curvature of said further bearing means whereby said bearing means engages said medial groove substantially tangentially, said medial groove and said bearing means on each of said support portions lying in a common vertical plane thereby forming a triangle of contact points preventing any substantial sideways movement of said weighbridge component.

13. The invention according to claim 12 in which said bearing means on said link plate are convexedly curved on at least the upper surface thereof, said curvature of said concave bearings on said chair being greater than the convex curvature of said bearing means on said link plate whereby said concave bearings engage said bearing means tangentially.

14. The invention according to claim 12 in which said chair includes a substantially horizontal planar attaching plate for securement to said weighbridge a pair of spaced and parallel opposed side plates extending downwardly from opposing edges of said attaching plate, one upon each side thereof, and a concave substantially semi-circular bearing on the lower end of each side plate centrally located between the ends of of said side plates and operatively engaging said link plate.

15. The invention according to claim 14 in which said bearing means on said link plate are convexedly curved on at least the upper surface thereof, said curvature of said concave bearings on said chair being greater than the convex curvature of said bearing means on said link plate whereby said concave bearings engage said bearing means tangentially.

* * * * *